INVENTOR.
Oscar B. Bjorge
BY Fay, Oberlin & Fay
ATTORNEYS

Feb. 14, 1928.

O. B. BJORGE 1,659,455

DRIVE FOR CABLE WINDING DRUMS

Filed Sept. 11, 1924

3 Sheets-Sheet 2

INVENTOR.
Oscar B. Bjorge
BY
Fay, Oberlin + Fay
ATTORNEYS.

Feb. 14, 1928.

O. B. BJORGE 1,659,455

DRIVE FOR CABLE WINDING DRUMS

Filed Sept. 11, 1924  3 Sheets-Sheet 3

INVENTOR.
Oscar B. Bjorge
BY
Fay, Oberlin & Fay
ATTORNEYS

Patented Feb. 14, 1928.

1,659,455

UNITED STATES PATENT OFFICE.

OSCAR B. BJORGE, OF DULUTH, MINNESOTA, ASSIGNOR TO CLYDE IRON WORKS, OF DULUTH, MINNESOTA, A CORPORATION OF MAINE.

DRIVE FOR CABLE-WINDING DRUMS.

Application filed September 11, 1924. Serial No. 737,072.

In logging engines and in other related types of hoisting mechanism, in which cable winding drums are employed, a convenient arrangement for driving such a drum at two different speeds, as frequently is desirable, consists in loosely mounting the drum on a shaft between gears of different diameters, such gears in turn meshing with suitable pinions fixed on an adjacent driving shaft. By clutching one or the other of the aforesaid gears to the adjacent end of the drum, the latter may accordingly be driven at a rate of speed corresponding with the gear ratio of either such pairs of gears and pinions.

In the construction usually employed, the gears in question are movable longitudinally of the shaft and the inwardly directed face of each gear and the corresponding outwardly directed face of the drum are provided with complementary friction elements that are brought into engagement when the gear is pressed towards the drum and released on movement of the gear away from the drum. This construction necessarily requires that the drum while left free to rotate on the shaft should be firmly held against longitudinal movement. Difficulty is also encountered in promptly freeing one gear from engagement with the adjacent drum end before the other gear is engaged with the other end of the drum.

The object of the present invention, accordingly, is to provide an improved form of band friction clutch for thus securing a gear to a drum end, or equivalent member to be driven. Such band friction clutch obviously requires to be specially designed to meet the situation in which both the driving and driven members are freely rotatable and may require to be clutched together in various angular positions about the common shaft on which they are mounted.

To the accomplishment of the foregoing and related ends, the invention, then, consists of the means hereinafter fully described and particularly pointed out in the claims, the annexed drawings and the following description setting forth in detail certain mechanism embodying the invention, such disclosed means constituting, however, but one of various mechanical forms in which the principle of the invention may be used.

In said annexed drawings:—

Figure 1:
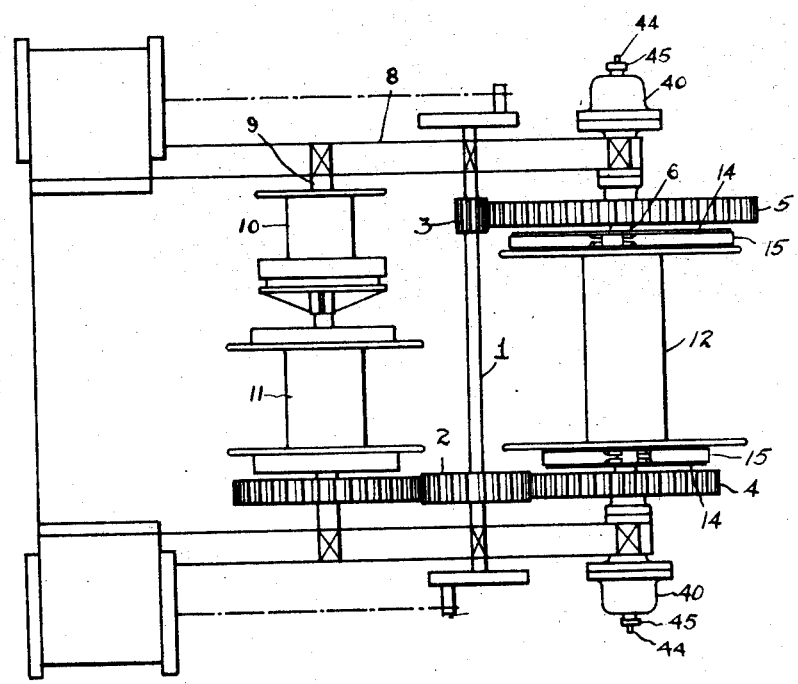
Figure 4:
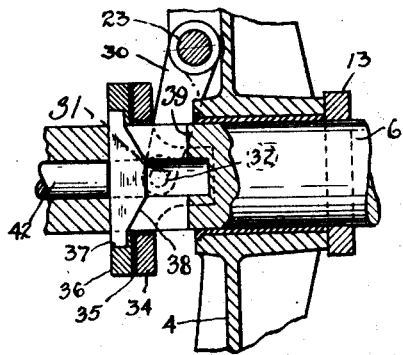
Figure 5:
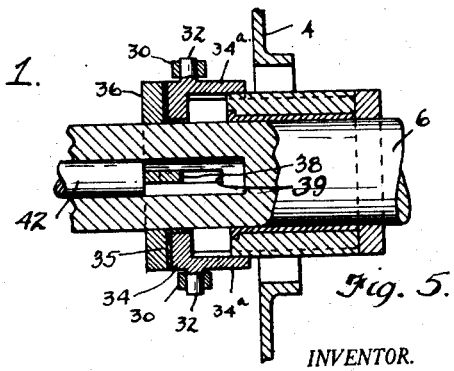
Figure 2:
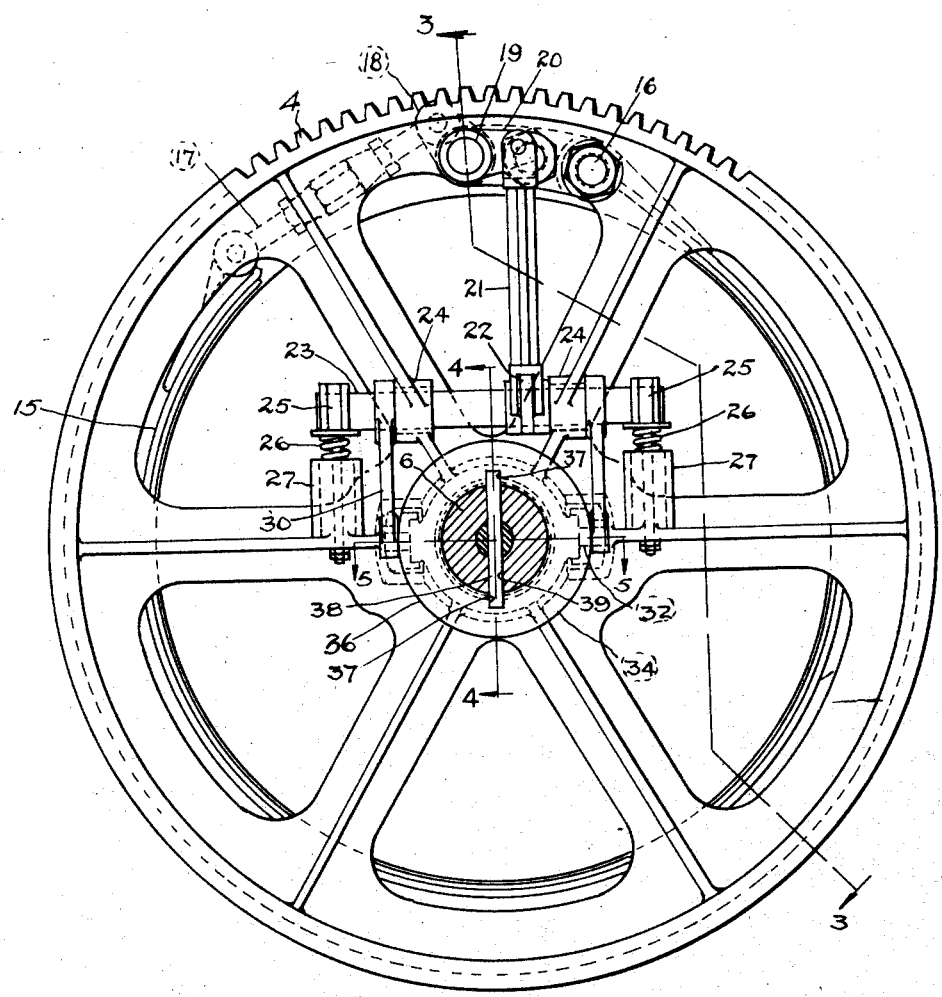
Figure 3:
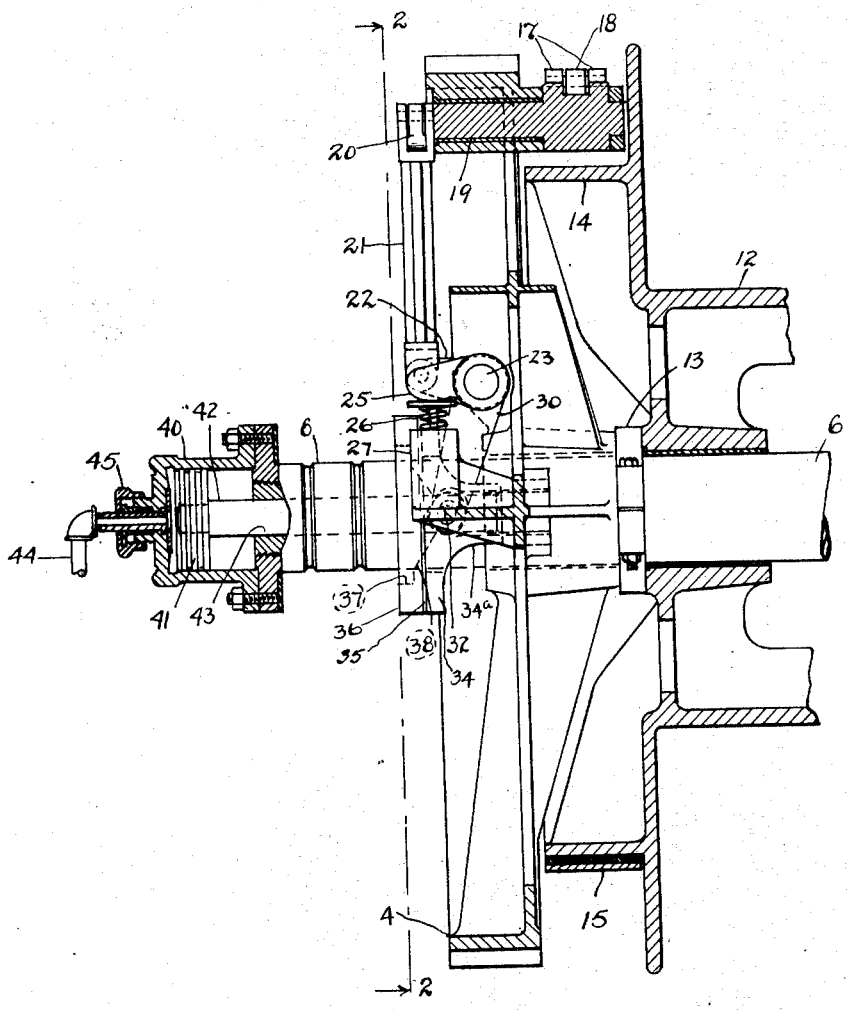

Fig. 1 is a plan view, more or less diagrammatic in character, showing a logging engine with a two speed drum arranged to be driven through the medium of band friction devices embodying my improved construction; Fig. 2 is an elevation of one end of such drum and corresponding gear, the shaft whereon they are mounted being shown in section; Fig. 3 is a sectional view of the foregoing, the section being taken on the angularly related planes indicated by the broken lines 3—3, Fig. 2; and Figs. 4 and 5 are respectively two axial sections of the shaft and certain accessory parts, the planes of the sections being respectively indicated by the lines 4—4 and 5—5, Fig. 2.

The logging engine shown in Fig. 1, it will be understood, illustrates but one adaptation and field of use of my improved driving mechanism. Such engine, as usual, includes a crank shaft 1, which constitutes the drive shaft for the mechanism of present interest. Said crank shaft is provided with two pinions 2 and 3, keyed or otherwise fixedly secured thereto and of different diameters, which are complementary to the diameters of two corresponding gears 4 and 5, rotatably mounted on a drum shaft 6, parallel with said crank shaft 1.

As conventionally illustrated, said crank shaft is designed to be journaled in suitable bearings in a frame 8 on which is also mounted a second shaft 9 that carries other cable winding drums 10 and 11, which are of no interest in the present connection.

Rotatably mounted on shaft 6 between gears 4 and 5 is a two speed winding drum 12, so called because it is designed to be driven at two different speeds through said gears and the corresponding pinions 2 and 3, depending upon which gear is clutched to the drum. The drum and gears are both bushed and made to run free on the shaft, while in order to prevent longitudinal displacement of the drum on shaft 6, split collars 13 are secured to the latter, one in contact with each end of the drum, as best shown in Fig. 3. The gears will contact with the outwardly directed sides of the corresponding collars.

Each end of the drum 12 carries an integral outwardly projecting annular flange 14, the outer cylindrical surface of which is adapted to be frictionally engaged by a flexible band 15, on the order of the familiar brake band or friction band, that is carried by the adjacent gear, e. g., the gear 4 at the end of the drum illustrated in Figs. 2 and 3. Said band has its one end fastened to the gear through the medium of a stud or pin 16 on the inwardly directed face of such gear, while the other end of the band is fastened through the medium of an adjustable link 17 to one arm 18 of a rocker 19 that is journaled in the gear at a point circumferentially spaced only a short distance from the stud 16. The other arm 20 of said rocker is connected, by means of a reach rod or link 21, to an arm 22 rigid with and projecting outwardly from an oscillatory shaft 23 that is mounted in transversely aligned bearings 24 on the gear adjacent the hub thereof. Such shaft 23, in other words, is disposed at right angles to the shaft 6 on which the gear is mounted. Adjacent its respective ends, said shaft is also provided with rigid, outwardly projecting arms 25 which bear against the upper ends of corresponding compression springs 26 suitably mounted in pockets 27 carried by the gear. The action of these springs will obviously be to rotate the shaft 23 in a clockwise direction, as viewed in Fig. 3, and thereby oscillate rocker 19 in a counter-clockwise direction through the medium of the connecting link 21. Such movement of the rocker 19 will in turn loosen the friction band 15 or, in other words, disengage the gear from the drum, so that the latter may rotate freely without reference to said gear.

Keyed or otherwise fixedly secured to shaft 23 are two downwardly projecting arms 30, these being preferably located on the shaft adjacent the outer faces of the bearings 24, whereby the shaft will be held against endwise movement in such bearings. The lower ends of arms 30 have slotted holes 31 that fit over oppositely directed pins 32 on a collar 34 (see Figs. 4 and 5), slidably mounted on shaft 6 beyond the hub of gear 4. To assist in guiding the collar 34 in such endwise movement, it is desirably provided with arms 34ª that extend parallel with the shaft and ride over suitable surfaces on the hub of the gear. This collar is fitted with a bushing 35 of angular or L-shape in cross-section which bears against a second collar 36, likewise slidable along the shaft 6. Collar 36 is formed with two opposite notches 37 into which fit the ends of a key 38. The latter rests in a transverse slot 39 in shaft 6, this slot being of sufficient longitudinal extent to permit limited movement of the key therein axially of the shaft.

The outer end of the shaft carries a cylinder 40 that is fitted with a piston 41 and piston rod 42, the latter extending through a central opening 43 in the shaft and having its inner end bearing against said key 38. The piston is adapted to be actuated inwardly by air, or equivalent pressure fluid, supplied to the cylinder 40 through pipe 44 and a swivel connection 45. The effect of such inward movement of the piston, communicated by means of piston rod 42 to key 38, is to force collar 34 inwardly and thereby to oscillate arms 30 in a counter-clockwise direction, as viewed in Fig. 3. The transverse shaft 23, to which said arms are attached, will be oscillated in a corresponding direction against compression springs 26 and as a result the rocker 19 will be actuated to draw link 17 and thus the end of the band 15, which is attched to said link, towards the other end of the band, which is attached to pin 16. In other words, the band is thus caused to close around the cylindrical flange 14 on the drum and as a result the gear and drum will be clutched together and so remain until the pressure on the key 38 is released.

It will be understood, of course, that the pressure fluid actuating means for forcing the key 38 inwardly are merely illustrative and that any other equivalent device, whereby pressure may be applied manually for example to said key, may be substituted. Changes may also be made in the location of the compression springs 26 and other parts of the mechanism. As a result of the foregoing construction, it will be seen that the friction band clutch may be operated so as to cause power to be transmitted from the one member to the other on shaft 6, regardless of direction or speed of rotation of said shaft. The action of the clutch in both directions is positive and sure, so that the gear and drum may be instantly connected together or the one freed from the other so that they may rotate independently upon the shaft 6. It will be noted that the springs 26, in addition to their previously explained function of releasing the band 15 from engagement with flange 14, serve another purpose in that when the clutch is thus released, the gear, regardless of any tendency that it might have from external causes, can not move to the left without compressing said springs and these are sufficiently stiff so that the gear is held at all times in proper position with its hub pressed against collar 13 on shaft 6. It will also be noted that collar 36 turns with the shaft 6 by virtue of its connection therewith through the medium of key 38, while collar 34, on the other hand, turns with the gear by virtue of the connection therewith through the medium of pins 32 on said collar and the arms 30 on shaft 23 that engage with said pins. Accordingly, while collars 34 and 36 will be in motion relatively to each other except when the clutch is applied, at this time not only will the drum, gear and shaft 6 all rotate together, but there will be no relative motion between the collars. In other words, there will be little occasion for the contacting surfaces of these collars to wear since there is no relative movement between them at the only time when any heavy pressure is applied thereto.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In power transmission mechanism, the combination of a shaft normally freely rotatable; a member to be driven normally freely rotatable upon said shaft, said member being provided with a laterally projecting friction drum; a driving member adjacent said drum and likewise normally freely rotatable on said shaft; a friction band attached at one end to said driving member and adapted to engage said drum; a collar fixed on said shaft between said driving and driven members; and means carried by said driving member and connected with the other end of said band for contracting or expanding the same as desired, said means being operable irrespective of the rotative positions of said shaft and driving and driven members relatively to each other, said means being also adapted to hold said driving member against longitudinal displacement on said shaft.

2. In power transmission mechanism, the combination of a shaft normally freely rotatable; a member to be driven normally freely rotatable upon said shaft, said member being provided with a laterally projecting friction drum; a driving member adjacent said drum and likewise normally freely rotatable on said shaft; a friction band attached at one end to said driving member and adapted to engage said drum; a rocker on said driving member connected with the other end of said band for contracting or expending the same as desired; a shaft oscillatorily mounted on said driving member about an axis transverse of said first shaft; lever and link connections between said oscillatory shaft and rocker; means tending to oscillate said second shaft to expand said band; an arm on said second shaft extending alongside said first shaft; and a collar slidable as well as rotatable on said first shaft and engaging said arm, whereby said second shaft may be oscillated to contract said band.

3. In power transmission mechanism, the combination of a shaft normally freely rotatable; a member to be driven normally freely rotatable upon said shaft, said member being provided with a laterally projecting friction drum; a driving member adjacent said drum and likewise normally freely rotatable on said shaft; a friction band attached at one end to said driving member and adapted to engage said drum; a rocker on said driving member connected with the other end of said band for contracting or expanding the same as desired; a shaft oscillatorily mounted on said driving member about an axis transverse of said first shaft; lever and link connections between said oscillatory shaft and rocker; means tending to oscillate said second shaft to expand said band; an arm on said second shaft extending alongside said first shaft; a collar slidable as well as rotatable on said first shaft and engaging said arm, whereby said second shaft may be oscillated to contract said band; and a second collar keyed on said first shaft so as to be movable longitudinally of the latter against said first collar.

4. In power transmission mechanism, the combination of a shaft normally freely rotatable; a member to be driven normally freely rotatable upon said shaft, said member being provided with a laterally projecting friction drum; a driving member adjacent said drum and likewise normally freely rotatable on said shaft; a friction band attached at one end to said driving member and adapted to engage said drum; a rocker on said driving member connected with the other end of said band for contracting or expanding the same as desired; a shaft oscillatorily mounted on said driving member about an axis transverse of said first shaft; lever and link connections between said oscillatory shaft and rocker; means tending to oscillate said second shaft to expand said band; an arm on said second shaft extending alongside said first shaft; a collar slidable as well as rotatable on said first shaft and engaging said arm, whereby said second shaft may be oscillated to contract said band; a second collar on said first shaft adjacent said first collar; a key in said first shaft movable longitudinally thereof and engaging said second collar to impart like movement thereto and at the same time retain the same against rotation; and a rod reciprocably mounted in said first shaft and engaging said key thus to actuate the same.

5. In power transmission mechanism, the combination of a shaft normally freely rotatable; a member to be driven normally freely rotatable upon said shaft, said member being provided with a laterally projecting friction drum; a driving member adjacent said drum and likewise normally freely rotatable on said shaft; a friction band attached at one end to said driving member and adapted to engage said drum; a rocker on said driving member connected with the other end of said band for contracting or expanding the same as desired; a shaft oscillatorily mounted on said driving member about an axis transverse of said first shaft; lever and link connections between said oscillatory shaft and rocker; an arm projecting from said second shaft; a compression spring engaging said arm and tending to oscillate said second shaft to expand said band; a second arm on said second shaft extending alongside said first shaft; and a collar slidable as well as rotatable on said first shaft and engaging said arm, whereby said second shaft may be oscillated to contract said band.

Signed by me, this 8th day of September, 1924.

OSCAR B. BJORGE.